US008445416B2

(12) United States Patent
Cotter et al.

(10) Patent No.: US 8,445,416 B2
(45) Date of Patent: *May 21, 2013

(54) SOLID STICK COMPOSITIONS COMPRISING VINYL ESTER

(75) Inventors: John Cotter, Vancouver (CA); Annette Ueckert, Barnaby (CA); Xin Lu, Vancouver (CA); Donald Eadie, Vancouver (CA)

(73) Assignee: L.B. Foster Rail Technologies, Corp., Burnaby (CA)

( * ) Notice: Subject to any disclaimer, the term of this patent is extended or adjusted under 35 U.S.C. 154(b) by 443 days.

This patent is subject to a terminal disclaimer.

(21) Appl. No.: 11/698,046

(22) Filed: Jan. 26, 2007

(65) Prior Publication Data

US 2008/0182766 A1    Jul. 31, 2008

(51) Int. Cl.
*C10M 125/08* (2006.01)
*C10M 125/02* (2006.01)
*C10M 123/04* (2006.01)

(52) U.S. Cl.
USPC .......................................... 508/125; 508/120

(58) Field of Classification Search
USPC ................... 508/100, 108, 109, 125
See application file for complete search history.

(56) References Cited

U.S. PATENT DOCUMENTS

| 3,539,480 | A | | 11/1970 | Neuwirth et al. | |
|---|---|---|---|---|---|
| 3,632,861 | A | * | 1/1972 | Hargis, Jr. | 525/529 |
| 4,367,220 | A | | 1/1983 | Boulogne et al. | |
| 4,575,430 | A | * | 3/1986 | Periard et al. | 508/113 |
| 4,753,743 | A | | 6/1988 | Sech | |
| 4,811,818 | A | | 3/1989 | Jamison | |
| 4,915,856 | A | | 4/1990 | Jamison | |
| 5,054,582 | A | | 10/1991 | Aracil | |
| 5,173,204 | A | * | 12/1992 | Chiddick et al. | 508/167 |
| 5,226,929 | A | * | 7/1993 | Morii et al. | 51/298 |

(Continued)

FOREIGN PATENT DOCUMENTS

| CA | 1065533 | 10/1979 |
|---|---|---|
| CA | 2057020 | 12/1990 |

(Continued)

OTHER PUBLICATIONS

Harrison et al., (2000) Proceedings The 5th International Conference on Contact Mechanics and Wear of Rail/Wheel Systems CM 2000 (SEIKEN Symposium No. 27), pp. 30-34.

(Continued)

*Primary Examiner* — Pamela H Weiss
(74) *Attorney, Agent, or Firm* — Sughrue Mion, PLLC (57) ABSTRACT

A solid stick composition for use on steel surfaces that are in sliding or rolling-sliding contact. The solid stick composition comprises a vinyl ester resin, for example, from about 20 to about 80 weight percent vinyl ester resin, a solid lubricant, for example from about 0 to about 80 weight percent lubricant, and optionally a friction modifier, for example from about 0 to about 40% weight percent friction modifier, or a combination of a solid lubricant and a friction modifier. The solid stick comprises at least one of the lubricant or the friction modifier. A method of controlling friction between a metal surface and a second metal surface by applying the solid stick composition to one or more than one of the metal surfaces is also disclosed as well as a method of reducing lateral force in a rail system comprising applying the solid stick composition onto a wheel or rail surface.

18 Claims, 6 Drawing Sheets

U.S. PATENT DOCUMENTS

| | | | | |
|---|---|---|---|---|
| 5,245,770 A * | 9/1993 | Ko et al. | | 37/443 |
| 5,251,724 A | 10/1993 | Szatkowski et al. | | |
| 5,308,516 A | 5/1994 | Chiddick | | |
| 5,337,860 A | 8/1994 | Burke et al. | | |
| 5,348,346 A * | 9/1994 | Unger | | 280/819 |
| 5,427,688 A * | 6/1995 | Sivavec | | 210/639 |
| 5,435,925 A | 7/1995 | Jamison | | |
| 5,803,210 A * | 9/1998 | Kohno et al. | | 188/73.1 |
| 5,965,658 A * | 10/1999 | Smith et al. | | 524/496 |
| 5,972,855 A | 10/1999 | Honary | | |
| 6,020,063 A * | 2/2000 | Riffle et al. | | 428/357 |
| 6,281,293 B1 * | 8/2001 | Fujii | | 525/233 |
| 6,569,816 B2 | 5/2003 | Oohira et al. | | |
| 6,641,919 B1 * | 11/2003 | Hayashi et al. | | 428/403 |
| 6,642,159 B1 * | 11/2003 | Bhatnagar et al. | | 442/134 |
| 6,649,573 B2 * | 11/2003 | Mitrovich | | 508/131 |
| 6,854,908 B2 | 2/2005 | Hui et al. | | |
| 2002/0128423 A1 * | 9/2002 | Yuasa et al. | | 528/129 |
| 2003/0101897 A1 | 6/2003 | Mitrovich et al. | | |
| 2003/0195123 A1 | 10/2003 | Cotter | | |
| 2004/0038831 A1 | 2/2004 | Eadie | | |
| 2004/0043908 A1 | 3/2004 | Mitrovich | | |
| 2007/0010405 A1 * | 1/2007 | Eadie et al. | | 508/100 |
| 2007/1001045 | 1/2007 | Eadie et al. | | |
| 2008/0182766 A1 | 7/2008 | Cotter et al. | | |
| 2008/0220997 A1 * | 9/2008 | Eadie et al. | | 508/113 |

FOREIGN PATENT DOCUMENTS

| | | |
|---|---|---|
| CA | 2070278 | 10/1992 |
| CA | 2070278 A1 | 10/1992 |
| CA | 2 306 144 A1 | 4/1999 |
| CA | 2369814 | 9/2002 |
| CA | 2477156 | 5/2003 |
| CA | 2444117 | 4/2004 |
| CA | 2597830 | 8/2006 |
| EP | 0 372 559 | 6/1990 |
| EP | 0372559 A1 | 6/1990 |
| WO | WO 90/15123 | 12/1990 |
| WO | WO 98/13445 | 4/1998 |
| WO | WO 02/26919 | 4/2002 |
| WO | WO 2006/026859 | 3/2006 |
| WO | WO 2006/084386 | 8/2006 |
| WO | WO 2006084386 A1 * | 8/2006 |
| WO | WO 2006/116877 | 11/2006 |

OTHER PUBLICATIONS

Matsumo et al., (2000), Proceedings The 5th International Conference on Contact Mechanics and Wear of Rail/Wheel Systems CM 2000 (SEIKEN Symposium No. 27), pp. 197-202.

Office action dated Nov. 20, 2009 issued in U.S. Appl. No. 11/884,252.

Office action dated Oct. 30, 2009 issued in U.S. Appl. No. 11/428,982.

Notice of Allowance dated Jan. 19, 2010 issued in U.S. Appl. No. 11/428,982.

International Search Report dated May 18, 2006 (PCT/CA2006/000215).

USPTO Restriction Requirement dated Nov. 10, 2008 issued in U.S. Appl. No. 11/428,982.

USPTO Office Action dated Apr. 2, 2009 issued in U.S. Appl. No. 11/428,982.

USPTO Office Action dated Jun. 22, 2010 issued in U.S. Appl. No. 11/884,252.

U.S. Non-Final Office Action issued in related U.S. Appl. No. 11/884,252 dated Dec. 22, 2010.

Final Office Action dated Aug. 15, 2011, issued in U.S. Appl. No. 11/884,252.

Chinese Office Action dated Jul. 21, 2011, issued in Chinese Patent Application No. 200880009908.1.

Chinese Office Action issued in corresponding application No. 200880009908.1 dated Jan. 18, 2012.

European Search Reported issued in corresponding application No. 08706304.6 dated Jan. 24, 2012.

Chinese Office Action issued in Application No. 200880009908.1 dated Apr. 25, 2012.

Australian Office Action issued in corresponding application No. 2008209287 dated Jul. 5, 2012.

U.S. Office Action issued in related U.S. Appl. No. 11/884,252 dated Jun. 28, 2012.

European Examination Report dated Sep. 24, 2012 issued in corresponding European Application 8706304.6.

English translation of a Chinese Office Action dated Aug. 3, 2012 issue in corresponding Chinese application No. 200880009908.1.

* cited by examiner

SOLID STICK COMPOSITIONS COMPRISING VINYL ESTER

FIELD OF INVENTION

The present invention relates to solid sticks compositions. More specifically, the invention pertains to solid stick compositions comprising vinyl esters.

BACKGROUND OF THE INVENTION

The control of friction and wear of metal mechanical components that are in sliding or rolling-sliding contact is of great importance in the design and operation of many machines and mechanical systems. For example, many steel-rail and steel-wheel transportation systems including freight, passenger and mass transit systems suffer from the emission of high noise levels and extensive wear of mechanical components such as wheels, rails and other rail components such as ties. The origin of such noise emissions, and the wear of mechanical components may be directly attributed to the frictional forces and behaviour that are generated between the wheel and the rail during operation of the system.

In a dynamic system wherein a wheel rolls on a rail, there is a constantly moving zone of contact. For purposes of discussion and analysis, it is convenient to treat the zone of contact as stationary while the rail and wheel move through the zone of contact. When the wheel moves through the zone of contact in exactly the same direction as the rail, the wheel is in an optimum state of rolling contact over the rail. In so such a case, no appreciable friction exists between the wheel and the rail. However, because the wheel and the rail are profiled, often misaligned and subject to motions other than strict rolling, the respective velocities at which the wheel and the rail move through the zone of contact are not always the same. This is often observed when fixed-axle railcars negotiate curves wherein true rolling contact can only be maintained on both rails if the inner and the outer wheels rotate at different peripheral speeds. This is not possible on most fixed-axle railcars. Thus, under such conditions, the wheels undergo a combined rolling and sliding movement relative to the rails. Sliding movement may also arise when traction is lost on inclines thereby causing the driving wheels to slip.

The magnitude of the sliding movement is roughly dependent on the difference, expressed as a percentage, between the rail and wheel velocities at the point of contact. This percentage difference is termed creepage.

At creepage levels larger than about 1%, appreciable frictional forces are generated due to sliding, and these frictional forces result in noise and wear of components (H. Harrison, T. McCanney and J. Cotter (2000), Recent Developments in COF Measurements at the Rail/Wheel Interface, Proceedings The 5$^{th}$ International Conference on Contact Mechanics and Wear of Rail/Wheel Systems CM 2000 (SEIKEN Symposium No. 27), pp. 30-34, which is incorporated herein by reference). The noise emission is a result of a negative friction characteristic that is present between the wheel and the rail system. A negative friction characteristic is one wherein friction between the wheel and rail generally decreases as the creepage of the system increases in the region where the creep curve is saturated. Theoretically, noise and wear levels on wheel-rail systems may be reduced or eliminated by making the mechanical system very rigid, reducing the frictional forces between moving components to very low levels or by changing the friction characteristic from a negative to a positive one, that is by increasing friction between the rail and wheel in the region where the creep curve is saturated. Unfortunately, it is often impossible to impart greater rigidity to a mechanical system, such as in the case of a wheel and rail systems used by most trains. Alternatively, reducing the frictional forces between the wheel and the rail may greatly hamper adhesion and braking and is not always suitable for rail applications. In many situations, imparting a positive frictional characteristic between the wheel and rail is effective in reducing noise levels and wear of components.

It is also known that, wear of train wheels and rails may be accentuated by persistent to and fro movement resulting from the presence of clearances necessary to enable a train to move over a track. These effects may produce undulatory wave patterns on rail surfaces and termed corrugations. Corrugations increase noise levels beyond those for smooth rail-wheel interfaces and ultimately the problem can only be cured by grinding or machining the rail and wheel surfaces. This is both time consuming and expensive.

There are a number of lubricants known in the art and some of these are designed to reduce rail and wheel wear on rail roads and rapid transit systems. For example, U.S. Pat. No. 4,915,856 discloses a solid anti-wear, anti-friction lubricant. The product is a combination of anti-wear and anti-friction agents suspended in a solid polymeric carrier for application to the top of a rail. Friction of the carrier against the wheel activates the anti-wear and anti-friction agents. However, this product exhibits poor retentivity under field conditions and must be reapplied at frequent intervals.

U.S. Pat. No. 5,308,516, U.S. Pat. No. 5,173,204 and WO 90/15123 relate to solid friction modifier compositions having high and positive friction characteristics. These compositions display increased friction as a function of creepage, and comprise resins to impart the solid consistency of these formulations. The resins employed included amine and polyamide epoxy resins, polyurethane, polyester, polyethylene or polypropylene resins. European Patent application 0 372 559 relates to solid coating compositions for lubrication which are capable of providing an optimum friction coefficient to places where it is applied, and at the same time are capable of lowering abrasion loss.

While a number of solid stick compositions in the prior art exhibit a range of friction characteristics, including lubricant compositions or compositions with a positive friction characteristic, a limitation of these solid stick compositions is their fast consumption rate. Solid stick compositions must be repeatedly applied to the rail head or flange interface to ensure proper efficacy and such repeated application can result in substantial costs due to fast consumption rates of the sticks. Thus, there is a need for solid stick compositions which exhibit decreased consumption and wear to prolong the life of the sticks, while still provided effective control of friction and wear of metal mechanical components that are in sliding or rolling-sliding contact. Such solid stick compositions may be effectively used in either closed or open rail systems.

SUMMARY OF THE INVENTION

The present invention relates to solid sticks compositions. More specifically, the invention pertains to solid stick compositions comprising vinyl ester resin.

It is an object of the invention to provide an improved solid stick composition.

The present invention provides a solid stick composition comprising a vinyl ester resin. The solid stick composition may further comprise a lubricant, a friction modifier, or a combination thereof.

The present invention also pertains to a solid stick composition (A) comprising:

a) from about 20 to about 80 weight percent vinyl ester resin;
b) from 0 to about 80 weight percent lubricant; and
c) from 0 to about 40 weight percent friction modifier, wherein the solid stick composition comprises the lubricant, the friction modifier, or a combination thereof.

The present invention pertains to a solid stick composition (A) as just defined, wherein the composition comprises from about 30 to about 60 weight percent vinyl ester resin, more preferably from about 40 to about 55 weight percent vinyl ester resin.

The present invention pertains to a solid stick composition (A) as just defined, wherein the composition comprises from about 30 to about 70 weight percent solid lubricant, more preferably from about 45 to about 65 weight percent solid lubricant.

The present invention pertains to a solid stick composition (A) as just defined, further comprising from 1 to about 30 weight percent friction modifier.

An example of an embodiment of the present invention pertains to a solid stick composition (B) comprising:
a) from about 20 to about 80 weight percent vinyl ester resin; and
b) from about 20 to about 80 weight percent lubricant.

A further preferred embodiment of the present invention pertains to a solid stick composition (C) comprising:
a) from about 40 to about 60 weight percent vinyl ester resin; and
b) from about 40 to about 60 weight percent lubricant.

The present invention also provides a solid stick composition (A-C) as defined above, wherein the vinyl ester resin is selected from the group consisting of a vinyl polyester resin, a vinyl ester resin, a bisphenol vinyl ester resin, an epoxy vinyl ester resin, a bispenol epoxy vinyl ester resin, an epoxy novolac-based vinyl ester resin, and a brominated bispenol epoxy vinyl ester resin.

The present invention also relates to a solid stick composition (A-C) as described above, wherein the solid lubricant is selected from the group comprising molybdenum disulphide, tungsten disulphide, graphite, boron nitride, boric acid, aluminum stearate, zinc stearate, coal dust, carbon fibres, and a mixture thereof. In a preferred embodiment, the solid lubricant is selected from the group consisting of graphite, molybdenum disulphide and a mixture thereof. In a further preferred embodiment the solid lubricant is molybdenum disulphide.

The present invention pertains to a solid stick composition (A-C) as described above, wherein the composition does not comprise a thermosetting plasticizer.

The present invention also provides a method of controlling friction between a metal surface and a second metal surface by applying a solid stick composition comprising:
a) from about 20 to about 80 weight percent vinyl ester resin;
b) from 0 to about 80 weight percent lubricant; and
c) from 0 to about 40 weight percent friction modifier, wherein the solid stick composition comprises the lubricant, the friction modifier, or a combination thereof, to one or more than one of the metal surface. The metal surface may be a rail surface or wheel.

The present invention also provides a method of controlling friction between a metal surface and a second metal surface by applying the solid stick composition (A-C) as described above to one or more than one of the metal surfaces.

The present invention provides a method of reducing lateral force in a rail system comprising applying the solid stick (A-C) composition as described above onto a wheel or rail surface.

The present invention provides solid stick compositions that exhibit the property of controlling friction between steel surfaces, and may be used to reduce wear and energy consumption in rail systems. Furthermore, the solid stick compositions of the present invention comprising vinyl ester resin, provide superior performance when compared to solid stick compositions comprising other resin compositions, including isophthalic and orthophthalic unsaturated polyester resins, halogenated unsaturated polyester resins, polyurethane-acrylic resin, polyester resin, polyethylene resin, or polypropylene resins of the prior art (for example as disclosed in U.S. Pat. No. 5,308,516, which is incorporated herein by reference). The solid stick compositions of the present invention have a reduced consumption and reduced wear compared to solid stick compositions known in the art. The solid stick compositions of the present invention therefore last longer and provide a cost advantage over know solid stick compositions.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 1 shows a Stick Testing Apparatus (STA) developed to measure the consumption rate of solid stick compositions in an abrasive laboratory-controlled environment.

FIG. 2 shows the consumption rate of solid stick composition samples measured using STA testing.

FIG. 3 shows the consumption rate as a function of the distance traveled by a tram, of a standard low coefficient of friction (LCF) solid stick composition comprising isophthalic polyester resin compared to a solid stick composition comprising an epoxy vinyl ester resin.

DETAILED DESCRIPTION

The present invention relates to solid stick compositions. More specifically, the invention pertains to solid stick compositions comprising vinyl ester.

The following description is of a preferred embodiment.

The solid stick composition of the present invention generally comprises a vinyl ester resin, a solid lubricant, and optionally a friction modifier.

The present invention provides a solid stick composition for use on steel surfaces that are in sliding or rolling-sliding contact. The solid stick composition preferably comprises a vinyl ester resin, for example, from about 20 to about 80 weight percent vinyl ester resin, a solid lubricant, for example from about 0 to about 80 weight percent lubricant, and optionally a friction modifier, for example from about 0 to about 40 weight percent friction modifier, or a combination of a solid lubricant and a friction modifier, wherein the solid stick comprises at least one of the lubricant or the friction modifier.

The solid stick composition preferably does not comprise a thermosetting plasticizer, for example as disclosed in WO 2006/084386, as the wear of the solid composition stick is reduced compared to solid composition sticks that do not comprise the thermosetting plasticizer. Without wishing to be bound by theory it is thought that thermoplastic sticks melt, increasing the consumption rate of the stick. Therefore, a stick having the advantage of extended life (i.e. reduced consumption wear) will preferably not contain a thermosetting plasticizer.

Therefore, present invention also provides a solid stick composition for use on steel surfaces that are in sliding or rolling-sliding contact, the solid stick composition comprising a vinyl ester resin, for example, from about 20 to about 80 weight percent vinyl ester resin, a solid lubricant, for example from about 0 to about 80 weight percent lubricant, and optionally a friction modifier, for example from about 0 to about 40 weight percent friction modifier, or a combination of a solid lubricant and a friction modifier, wherein the solid stick comprises at least one of the lubricant or the friction modifier, and the solid stick does not comprise a thermosetting plasticizer.

The coefficient of friction may be measured using any suitable devise, for example, a push tribometer, or Tribo-Railer (H. Harrison, T. McCanney and J. Cotter (2000), Recent Developments in COF Measurements at the Rail/Wheel Interface, Proceedings The 5th International Conference on Contact Mechanics and Wear of Rail/Wheel Systems CM 2000 (SEIKEN Symposium No. 27), pp. 30-34, which is incorporated herein by reference).

As described herein, a composition having a Low Coefficient of Friction (LCF) can be characterized as having a coefficient of friction of less than about 0.2 when measured with a push tribometer. Preferably, under field conditions, LCF exhibits a coefficient of friction of about 0.2 or less. A positive friction characteristic is one in which friction between the wheel and rail systems increases as the creepage of the system increases. As described herein, a composition having a High Positive Friction (HPF) can be characterized as having a coefficient of friction from about 0.28 to about 0.4 when measured with a push tribometer. Preferably, under field conditions, HPF exhibits a coefficient of friction of about 0.35. A composition having a Very High Positive Friction (VHPF) can be characterized as having a coefficient of friction from about 0.45 to about 0.55 when measured with a push tribometer. Preferably, under field conditions, VHPF exhibits a coefficient of friction of 0.5. See WO 02/026919 (which is incorporated herein by reference) for examples of LCF, HPF and VHPF compositions.

When a lubricant is included in the solid stick composition of the present invention without a friction modifier the composition will typically have a low coefficient of friction. Inclusion of a friction modifier in the solid stick composition of the present invention generally provides compositions with a high or very high coefficient of friction.

By the term 'positive friction characteristic', it is meant that the coefficient of friction (CoF) between two surfaces in sliding or rolling-sliding contact increases as the creepage between the two surfaces increases. The term 'creepage' is a common term used in the art and its meaning is readily apparent to someone of skill in the art. For example, in the railroad industry, creepage may be described as the percentage difference between the magnitude of the velocity of the sliding movement of a rail relative to the magnitude of the tangential velocity of the wheel at the point of contact between wheel and rail, assuming a stationary zone of contact and a dynamic rail and wheel.

Various methods in the art may be used to determine if a friction control composition exhibits a positive friction characteristic. For example, but not wishing to be limiting, in the lab a positive friction characteristic may be identified using a disk rheometer or an Amsler machine ((H. Harrison, T. McCanney and J. Cotter (2000), Recent Developments in CoF Measurements at the Rail/Wheel Interface, Proceedings The 5th International Conference on Contact Mechanics and Wear of Rail/Wheel Systems CM 2000 (SEIKEN Symposium No. 27), pp. 30-34, which is incorporated herein by reference). Other two roller systems may be used to determine frictional control characteristics of compositions (e.g. A. Matsumo, Y. Sato, H. Ono, Y. Wang, M. Yamamoto, M. Tanimoto and Y.Oka (2000), Creep force characteristics between rail and wheel on scaled model, Proceedings The 5th International Conference on Contact Mechanics and Wear of Rail/Wheel Systems CM 2000 (SEIKEN Symposium No. 27), pp. 197-202; which is incorporated herein by reference). Sliding friction characteristics of a composition in the field, may be determined using for example but not limited to, a push tribometer.

Wheel squeal associated with a curved track may be caused by several factors including wheel flange contact with the rail gauge face, and stick-slip due to lateral creep of the wheel across the rail head. Without wishing to be bound by theory, lateral creep of the wheel across the rail head is thought to be the most probable cause of wheel squeal, while wheel flange contact with the rail gauge playing an important, but secondary role. Studies, as described herein, demonstrate that different friction control compositions may be applied to different faces of the rail-wheel interface to effectively control wheel squeal. For example, a composition with a positive friction characteristic as is known in the prior art, for example WO 02/26919 (which is incorporated herein by reference), or a solid stick composition of the present invention exhibiting a high (HPF) or very high (VHPF) coefficient of friction may be applied to the head of the rail-wheel interface to reduce lateral slip-stick of the wheel tread across the rail head, and a low friction control composition, for example as described in WO 02/26919, or a solid stick composition of the present invention exhibiting a low coefficient of friction(LCF), may be applied to the gauge face of the rail-wheel flange to reduce the flanging effect of the lead axle of a train car.

Example of vinyl ester resins include but are not limited to vinyl polyester resins, vinyl ester resins, bisphenol vinyl ester resins, epoxy vinyl ester resins, bispenol epoxy vinyl ester resins, epoxy novolac-based vinyl ester resins, and brominated bispenol epoxy vinyl ester resins.

Herein we demonstrate that the use of vinyl ester resins in solid stick compositions provide superior performance when compared to other resin compositions, including isophthalic and orthophthalic unsaturated polyester resins, halogenated unsaturated polyester resins, polyurethane-acrylic resin, polyester resin, polyethylene resin, or polypropylene resins of the prior art (e.g. U.S. Pat. No. 5,308,516, which is incorporated herein by reference).

By the term "unsaturated polyester resin" it is meant a thermoset resin from a range of different acids, glycols and monomers resulting in different and varying properties. Principle types of unsaturated polyester resins include Orthophthalic and Isophthalic unsaturated polyester resin: An example of a typical isophthalic polyester, as an idealized chemical structure is as follows:

*denotes reactive sites
n = 3 to 6

By the term "vinyl ester resin" it is meant a resin similar in molecular structure to polyester resins, but different primarily in the location of their reactive sites. The vinyl ester molecule also features fewer ester groups when compared to polyester resins. The reactive sites of vinyl ester resins are positioned at the ends of the molecular chains. Without wishing to be bound by theory, since the length of the molecular chain is available to absorb shock loadings this may make vinyl ester resins tougher and more resilient than polyester resins. An example of an idealized chemical structure of an epoxy based vinyl ester is as follows:

*denotes reactive sites
n = 1 to 2

Epoxy resins typically exhibit strong mechanical properties and resistance to environmental degradation. The term 'epoxy' refers to a chemical group consisting of an oxygen atom bonded to two carbon atoms that are already bonded in some way. The simplest epoxy is a three-member ring structure known by the term 'alpha-epoxy' or '1,2-epoxy'. The idealized chemical structure of a simple epoxy (ethylene oxide) is shown below:

Epoxy resins may be identified by an amber or brown coloring, and exhibit useful properties including good chemical and heat resistance and high adhesive strength. Epoxy resins are formed from a long chain molecular structure similar to vinyl ester with reactive sites at either end. In epoxy vinyl ester resins, however, epoxy groups instead of ester groups form these reactive sites. Without wishing to be bound by theory, the absence of ester groups means that the epoxy resin may have good water resistance, and the two ring groups at the centre of the epoxy molecule may absorb mechanical and thermal stresses better than linear groups. An idealized chemical structure of a typical epoxy resin (diglycidyl ether of bisphenol-A) is provided below:

Vinyl ester resins suitable for use in the solid stick compositions of the present invention include, but are not limited to:

- a vinyl polyester resin, for example but not limited to DION VPE 7100™
- a vinyl ester resin, for example but not limited to HETRON 922™, HETRON 980™, ESTAREZ 7222PA™, and DION 9800™
- a bisphenol vinyl ester, for example but not limited to DION 31038™
- a bispenol epoxy vinyl ester resin, for example but not limited to SWANCOR 901™, VIPEL F010™, VIPEL FOO7™, and DION VER9100™
- a novolac expoxy vinyl ester resin, for example but not limited to SWANCOR 900™, SWANCOR 907™, SWANCOR 907™, VIPEL F085™, VIPEL FO86™, and DERAKANE 470-300™
- a brominated bisphenol epoxy vinyl ester, for example but not limited to DION FR9300™

The amount of vinyl ester resin in the compositions of the present invention is from about 20 to about 80 weight percent, or any amount therebetween, for example, from about 25 to about 75 weight percent, from about 30 to about 70 weight percent, from about 35 to about 65 weight percent, from about 40 to about 60 weight percent, from about 40 to about 55 weight percent, from about 40 to about 50 weight percent and any amount therebetween, or about 20, 22, 24, 26, 28, 30, 32, 34, 36, 38, 40, 42, 44, 46, 48, 50, 52, 54, 56, 58, 60, 62, 64, 66, 68, 70, 72, 74, 76, 78 and 80 weight percent, or any amount therebetween.

As would be known to one of skill in the art, a catalyst may be required to initiate the hardening process of a resin as described above. Examples of catalysts include, but are not limited to, methylethylketone peroxide (for example but not limited to LUPEROX DDM-9™), cumyl hydroperoxide (for example but not limited to TRIGONOX 239A™), benzoyl peroxide, acetyl acetone peroxide, peroxy ester (for example but not limited to USP 245; for use with acrylated epoxidized soybean oil), or boron trifluoride diethyl etherare (BEF; for use with natural oils, for example fish, soybean, and tung oils). The use of other catalysts, or the amount of catalyst to be added can be readily determined by one of skill in the art to modify the setting rate of the resin, and should not be considered limiting to the present invention in any manner.

By the term 'lubricant' it is meant a chemical, compound or mixture thereof which is capable of reducing the coefficient of friction between two surfaces in sliding or rolling-sliding contact. Solid lubricants include but are not limited to molybdenum disulfide, tungsten disulfide, graphite, boron nitride, boric acid, aluminum stearate, zinc stearate and carbon compounds such as, but not limited to coal dust, and carbon fibres. Preferably, the lubricants, if employed, in the solid stick compositions of the present invention are molybdenum disulfide, graphite or a mixture thereof, most preferably molybdenum disulfide.

The solid lubricant provided in the stick compositions of the present invention may comprise a mixture of graphite and molybdenum disulfide. The amount of graphite may exceed that of molybdenum disulphide, for example a graphite:molybdenum disulphide ratio from about 3:1 to about 1:1, or any ratio therebetween, for example 3:1, 2.8:1, 2.6:1, 2.4:1, 2.2:1, 2:1, 2.0:1, 1.8:1, 1.6:1, 1.4:1, 1.2:1, and 1.0:1. However, the amount of molybdenum may also exceed the amount of graphite within solid stick compositions of the present invention, for example the graphite:molybdenum disulphide ratio may also vary from about 1:3 to about 0:1, or any ratio therebetween, for example 1:3, 1:2.5, 1:2.3, 1:2.0, 1:1.7, 1:1.5, 1:1.3, 1:1, 0.8:1, 0.6:1, 0.5:1, 0.4:1, 0.2:1 and 0:1, or any amount therebetween.

The amount of lubricant, when present in the compositions of the present invention is from about 1 to about 80 weight percent, or any amount therebetween, for example, from about 5 to about 75 weight percent, from about 10 to about 75 weight percent, from about 15 to about 75 weight percent, from about 20 to about 75 weight percent, from about 25 to about 75 weight percent, from about 30 to about 70 weight percent, from about 35 to about 65 weight percent, from about 40 to about 65 weight percent, from about 45 to about 65 weight percent, from about 50 to about 60 weight percent and any amount therebetween, or about 2, 4, 6, 8, 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78 and 80 weight percent, or any amount therebetween.

By the term 'friction modifier' it is meant a material which imparts a positive friction characteristic to the friction control composition of the present invention, or one which enhances the positive friction characteristic of a friction control composition when compared to a similar composition which lacks a friction modifier. The amount of friction modifier present in the solid stick composition may be from 0 to about 40 weight percent, or any amount therebetween, for example from about 5 to about 40 weight percent or any amount therebetween, from about 15 to about 35 weight percent or any amount therebetween, or 0, 2, 4, 6, 8, 10, 12, 14, 16, 18, 20, 22, 24, 26, 28, 30, 32, 34, 36, 38 and 40 weight percent, or any amount therebetween.

The friction modifier preferably comprises a powderized mineral and has a particle size in the range of about 0.5 microns to about 10 microns. Further, the friction modifier may be soluble, insoluble or partially soluble in water and preferably maintains a particle size in the range of about 0.5 microns to about 10 microns after the composition is deposited on a surface and the liquid component of the composition has evaporated. Friction modifiers, described in U.S. Pat. No. 5,173,204 and WO98/13445 (which are incorporated herein by reference) may be used in the composition described herein. Friction modifiers may include, but are not limited to:

Whiting (Calcium Carbonate)
Magnesium Carbonate
Talc (Magnesium Silicate)
Bentonite (Natural Clay)
Coal Dust (Ground Coal)
Blanc Fixe (Calcium Sulphate)
Asbestors (Asbestine derivative of asbestos)
China Clay; Kaolin type clay (Aluminium Silicate)
Silica—Amorphous (Synthetic)
Naturally occurring
Slate Powder
Diatomaceous Earth
Zinc Stearate
Aluminium Stearate
Magnesium Carbonate
White Lead (Lead Oxide)
Basic Lead Carbonate
Zinc Oxide
Antimony Oxide
Dolomite (MgCo CaCo)
Calcium Sulphate
Barium Sulphate (e.g. Baryten)
Polyethylene Fibres Aluminum Oxide Magnesium Oxide Zirconium
Oxide or combination thereof.

The compositions of the present invention may include a lubricant, a friction modifier, or a combination thereof, at an amount that results in the composition being characterized as comprising a coefficient of friction of from about 0.1 to about 0.26, or any amounts therebetween, for example, a composition of the present invention may comprise a coefficient of friction of about 0.10, 0.12, 0.14, 0.16, 0.18, 0.20, 0.22, 0.24, or 0.26 when measured for example using the Amsler machine.

The solid stick compositions of the present invention preferably do not include a thermosetting plasticizer. By the term 'plasticizer' or 'thermosetting plasticizer' it is meant a chemical, compound or mixture thereof which is capable of reducing the hardness of a solid stick composition, such as dioctyl phthalate, adipate and a polymeric plasticizer for example as disclosed in WO 2006/084386. Solid stick compositions comprising a thermosetting plasticizer exhibit higher rates of wear when compared to the solid stick compositions of the present invention.

The solid stick compositions of the present invention may optionally include other components, such as but not limited to, colour additives, wax to reduce tackiness of the set vinyl ester resin (for example up to 5% by weight wax in styrene), viscosity reducing agents, for example acetone, preservatives, consistency modifiers, defoaming agents, styrene and rheological control agents, either alone or in combination.

The solid stick compositions of the present invention may be loaded into an applicator for use when being applied against a steel surface. The applicator may be provided with a spring-loaded mechanism against which the stick is loaded. The spring-loaded mechanism provides pressure against the stick during application so that the stick is available for application to a steel surface. Non-limiting examples of straight applicators include those disclosed in WO 2006/026859 (which is incorporated herein by reference) and other applicators available from Kelsan Technologies (North Vancouver, Canada), or U.S. Pat. No. 4,811,818, U.S. Pat. No. 5,054,582, U.S. Pat. No. 5,251,724, U.S. Pat. No. 5,337,860, US 2003 0101897 (which are all incorporated herein by reference). Circular applicators may also be used with the solid stick compositions of the present invention. An example of a circular applicator includes, but is not limited to that described in U.S. Pat. No. 6,854,908 (which is incorporated herein by reference) or other circular applicators available from Kelsan Technologies (North Vancouver, Canada).

The solid sticks used within either straight or circular applicators are typically shorter than the length of the applicator and comprise a means for positively interfacing with other solid sticks present within the applicator. Such a positive interface may include a first end of the solid stick comprising a recess, while the second end comprises an extension that matingly engages the recess, see for example WO 2006/116877 (which is incorporated herein by reference), or other such mating composition sticks available from Kelsan Technologies (North Vancouver, Canada). Such a configuration ensures that solid sticks when inserted within the applicator positively engage the stick already in place within the applicator thereby retaining the stick within the applicator until it is consumed. This results in little or no waste of the stick during use as additional sticks may be inserted within the applicator and all of the prior stick is advanced against the steel surface. In the absence of the positive interface, small block of unused solid stick remains within the applicator prior to, or after, reloading and the last portion of the stick typically falls out of the applicator between the gap of the applicator and wheel surface. This wasted portion of stick may obstruct devises used along a rail track, for example switches, or wheels moving over a steel rail, and this waste also has environmental implications.

A solid stick design comprising the extension and recess as described above, for positive engagement may be produced using a molding process. Solid sticks that are produced by extrusion, for example, known solid sticks comprising low or high density polyethylene as a thermoplastic polymeric carrier, typically comprise flat ends resulting in the problems defined above relating to waste and possible obstruction of switches. The solid stick compositions of the present invention may be produced using a molding process and preferably comprise a first end comprising a recess, and a second end comprising an extension that matingly engages the recess so as to produce a positive engagement between the stick when in use in the applicator.

When a solid stick composition is applied under pressure against a steel surface in rolling-sliding contact with another steel surface, for example a steel rail wheel moving over a steel track, the solid stick composition wears down as it is continuously applied to the surface. The solid stick composition is consumed over an accumulated distance of travel of the wheel over the track. Once the solid stick composition is consumed it is replaced with another stick to maintain application of the composition to the steel surface.

Herein we demonstrate that use of vinyl ester resins, for example but not limited to vinyl ester resins and epoxy vinyl ester resins, provide improved consumption and wear performance when compared to other resin components, including isophthalic and orthophthalic unsaturated polyester resins and halogenated unsaturated polyester resins.

Figure 2A:
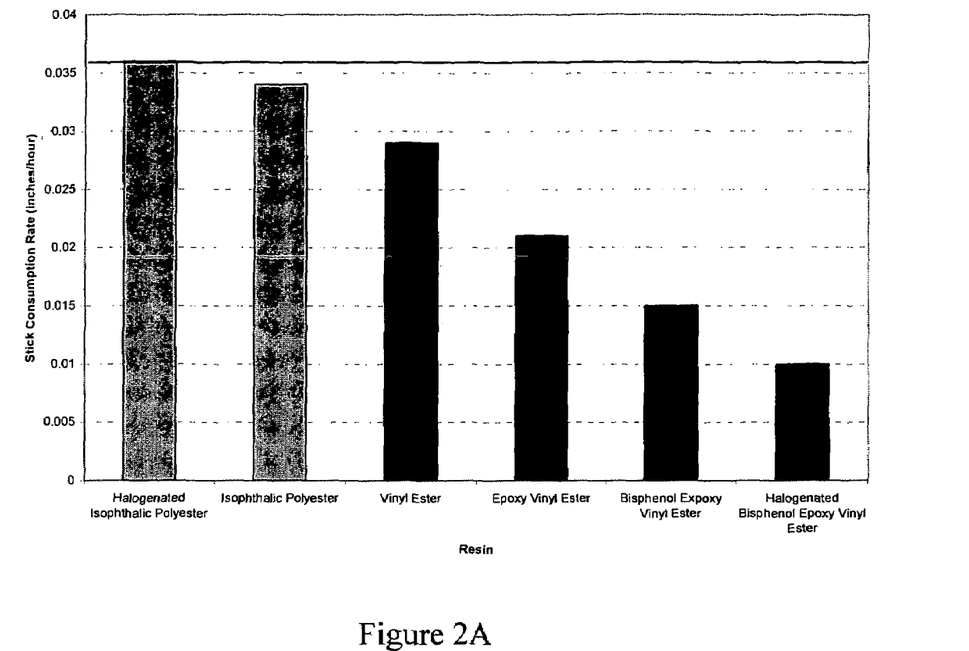
FIG. 2A shows the consumption rate of solid stick composition samples made from different types of resin and comprising 51% (w/w) molybdenum disulphide ($MoS_2$).
Figure 2B:
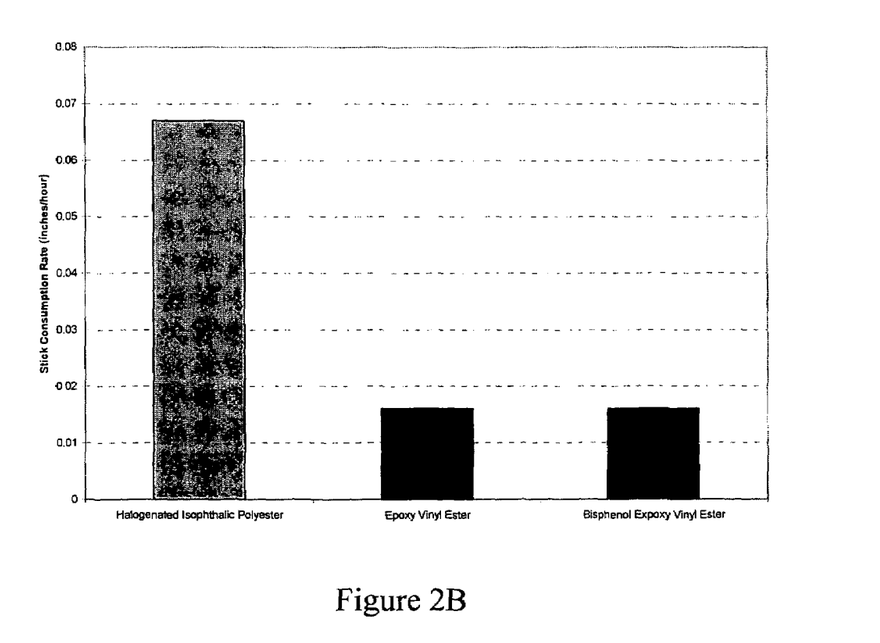
FIG. 2B shows the consumption rate of solid stick composition samples made from different types of resin and comprising 60% (w/w) molybdenum disulphide ($MoS_2$).

As described herein, it has been found that solid stick compositions samples comprising a vinyl ester resin, and a range of lubricant for example, but not limited to 50% or 60% (w/w molybdenum disulphide—$MoS_2$) have a lower stick consumption rate (displacement over a 60 minute period) than corresponding solid stick compositions comprising isophthalic polyester and halogenated isophthalic polyester resins (FIGS. 2A and 2B). The hardness of solid stick compositions comprising a range of different vinyl ester resins have similar hardness as solid compositions sticks comprising halogenated polyester resins or isophthalic polyester resins that are commonly used in known solid stick compositions (see Table 2, Examples). This indicates that hardness is not a good indicator of the wear resistance of a resin within a solid stick composition.

Figure 3A:
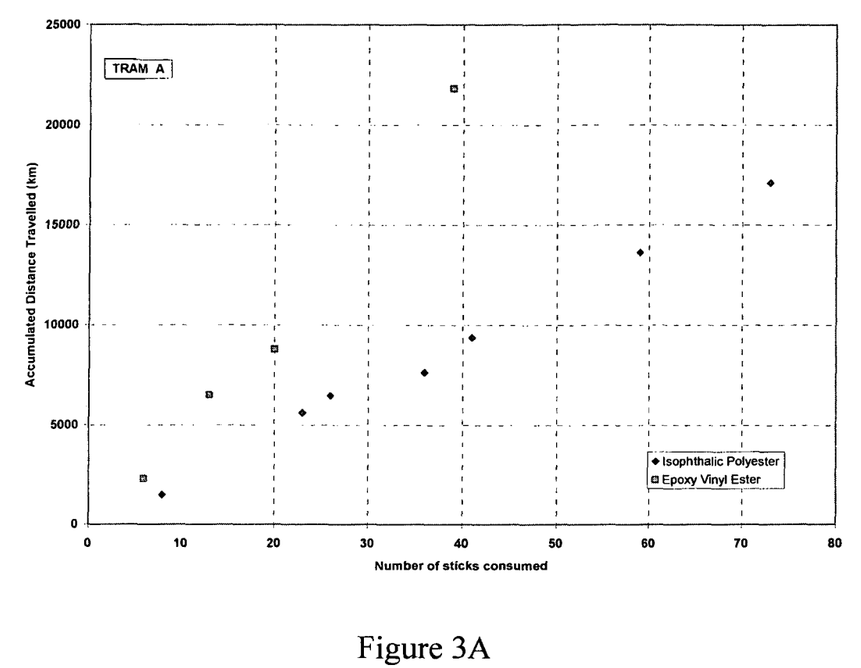
FIGS. 3A-3C show the results for trams A-C respectively, the trams being fitted with the solid stick compositions.
Figure 3B:
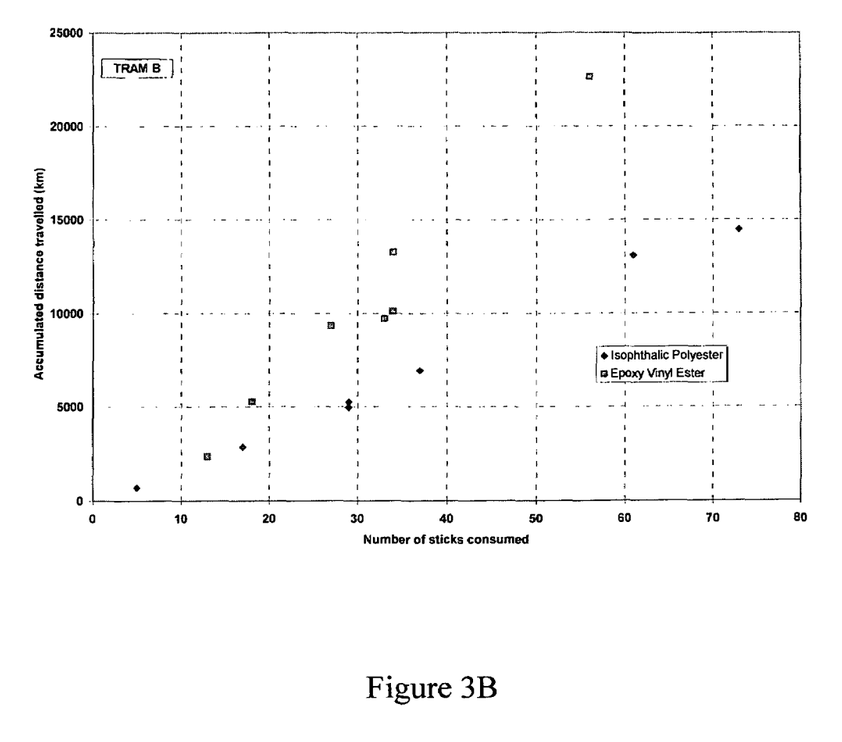
Figure 3C:
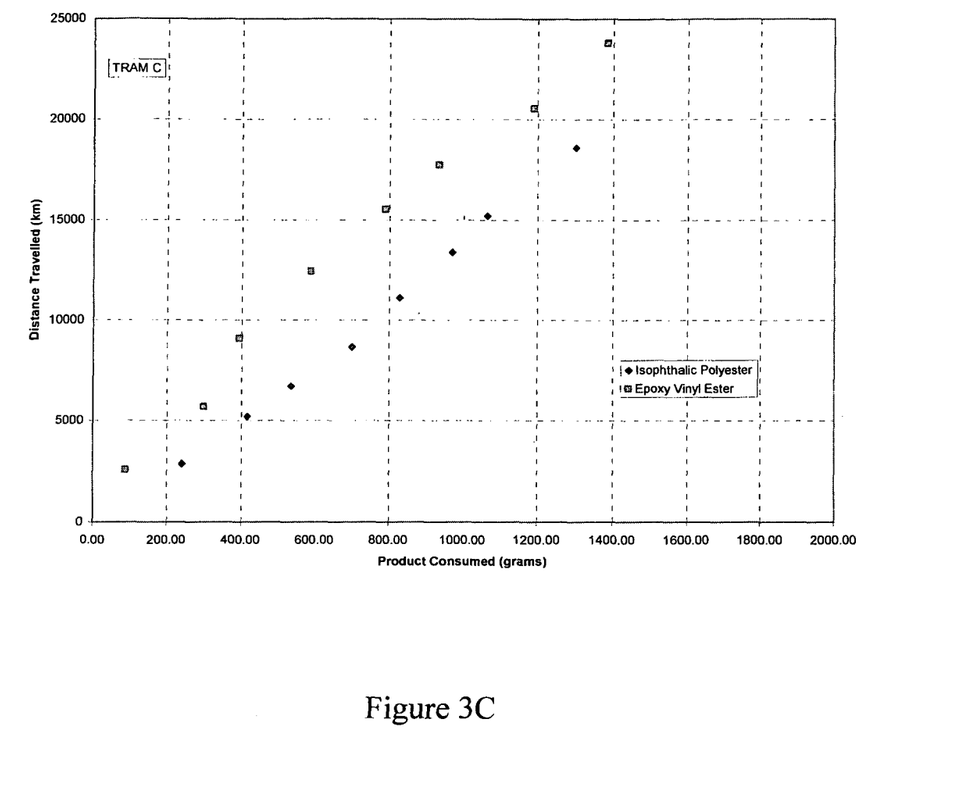

As described herein, trams outfitted with a solid stick composition comprising epoxy vinyl ester resin showed less consumption as a function of distance traveled compared to a standard LCF stick comprising an isophthalic polyester resin (FIG. 3A, FIG. 3B and FIG. 3C).

By having a reduced consumption rate and reduced wear compared to solid stick compositions known in the art, the solid stick compositions comprising vinyl ester resin advantageously last longer and provide a cost advantage over the know solid stick compositions.

The solid stick compositions of the present invention may further comprise components that one of skill in the art will appreciate may be substituted or varied without departing from the scope and spirit of the present invention. In addition, it is fully contemplated that the solid stick compositions of the present invention may be used in combination with other lubricants or friction control compositions. For example, but not wishing to be limiting, the compositions of the current invention may be used with other friction control compositions such as, but not limited to those disclosed in U.S. Pat. No. 5,308,516; U.S. Pat. No. 5,173,204; WO 02/26919, and US Publication 2003 0195123 and 2004 038831 (which are incorporated herein by reference).

The present invention will be further illustrated in the following examples. However, it is to be understood that these examples are for illustrative purposes only, and should not be used to limit the scope of the present invention in any manner.

EXAMPLE 1

Solid Stick Compositions

Examples of solid stick compositions comprising vinyl esters for testing were prepared using standard methods. Non-limiting sample compositions include those provided in Table 1. For each test, the resin component of the solid stick composition was varied. The resin components tested were as follows:

1. Group I resins—resins commonly used in solid stick compositions known in the art: a halogenated isophthalic polyester (HETRON 99P™); an isophlatic polyester with aluminatrihydrate (DION FR 850-200™); and a halogenated polyester (POLYLITE 33441-00™), 2. Group II resins—vinyl ester resins of the present invention: a bisphenol epoxy vinyl ester (DION VER 9100-00™) a brominated bisphenol epoxy vinyl ester (DION FR 9300™); a vinyl polyester (DION VPE 7100-06™); and an epoxy novolac-based vinyl ester (DERAKANE 470-300).

TABLE 1

Samples of solid stick compositions comprising either 51% (w/w) or 60% (w/w) of a lubricant (Molybdenum disulfide; MoS$_2$)

| Additive | % (w/w) | % (w/w) |
|---|---|---|
| Resin | 44.55 | 36.33 |
| Molybdenum disulphide | 51.87 | 60.00 |
| Styrene | 3.21 | 3.21 |
| Cobalt 2-Ethlhexanoate | .033 | 0.4 |
| Dimethylphenyl amine | 0.04 | 0.06 |
| Total | 100.00 | 100.00 |

It is to be understood that the concentration of lubricant in the solid stick composition described in Table 1 is not to limited to 51% (w/w) or 60% (w/w), as the amount of lubricant that may be used within the solid stick composition my range from about 0 to about 80% (w/w). Similarly, the solid stick composition may comprise a friction modifier from about 0 to about 40% (w/w). Preferably, the solid stick composition comprises either a lubricant, a friction modifier, or both a lubricant and a friction modifier.

EXAMPLE 2

Stick Hardness Testing (D-Type Durometer)

The average hardness of solid stick compositions samples comprising the different resin components given in Example 1 and 51.87%, 20.82% or 10.00% (w/w) lubricant (molybdenum disulfide (MoS$_2$)) were measured using a D-Type Durometer as would be know to one of skill in the art (ASTM D 2240 Standard Test Method for Rubber Property-Durometer Hardness). The method comprises pressing the Durometer against the sample, and measuring a material resistance force. The depth of the indentor was measured, which provides a measure of the material's hardness.

The results are given in Table 2 and indicate that solid stick composition samples comprising a vinyl ester resin (Group II resins) have a similar or lower average hardness compared with samples comprising halogenated polyester resins or isophthalic polyester resins (Group I resins) commonly used in known solid stick compositions.

TABLE 2

Average hardness of solid stick composition samples comprising different resin components and either 51.87%, 20.82% or 10.00% (w/w) molybdenum disulfide (MoS$_2$)

| Resin Name | Resin Family | MoS$_2$ Percentage | Average Hardness |
|---|---|---|---|
| Hetron 99P | Halogenated Isophthalic Polyester | 51.87 | 81 +/− 6 |
|  |  | 20.82 | 85 |
|  |  | 10.00 | 87 |
| DION VER 9100-00 | Bisphenol-Epoxy Vinyl Ester Aluminatrihydrate | 51.87 | 82 |
|  |  | 20.82 | 84 |
|  |  | 10.00 | 84 |
| DION FR 850-200 | Isophthalic Polyester, with Aluminatrihydrate | 51.87 | 69 |
|  |  | 20.82 | 86 |
|  |  | 10.00 | 88 |
| Polylite 33441-00 | Halogenated Polyester | 51.87 | 77 |
|  |  | 20.82 | 78 |
|  |  | 10.00 | 80 |
| DION VPE 7100-06 | Vinyl Polyester | 51.87 | 85 |
|  |  | 20.82 | 86 |
|  |  | 10.00 | 87 |
| Derakane 470-300 | Epoxy Vinyl Ester | 51.87 | 86 |
|  |  | 20.82 | 88 |
|  |  | 10.00 | 88 |
| DION FR 9300 | Brominated Bisphenol-Epoxy Vinyl Ester | 51.87 | 82 |
|  |  | 20.82 | 83 |
|  |  | 10.00 | 83 |

EXAMPLE 3

Stick Testing Apparatus (STA Testing)

A stick testing apparatus and test method was developed by Kelsan Technologies Corporation to measure solid stick composition consumption rates over a prolonged period of time and under variable abrasive surface conditions.

Figure 1A:
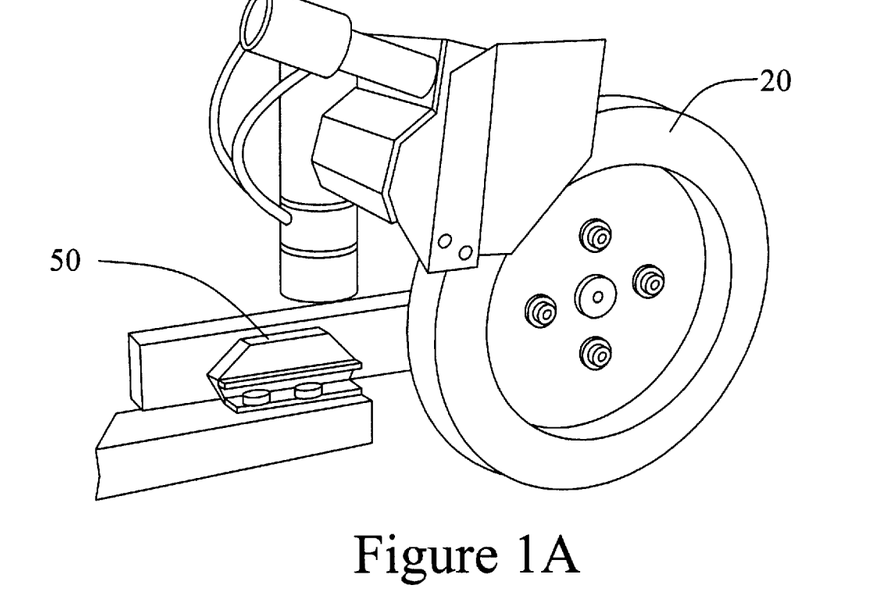
FIG. 1A shows the main wheel (20) and stick mounting bracket (50) of the STA.
Figure 1B:
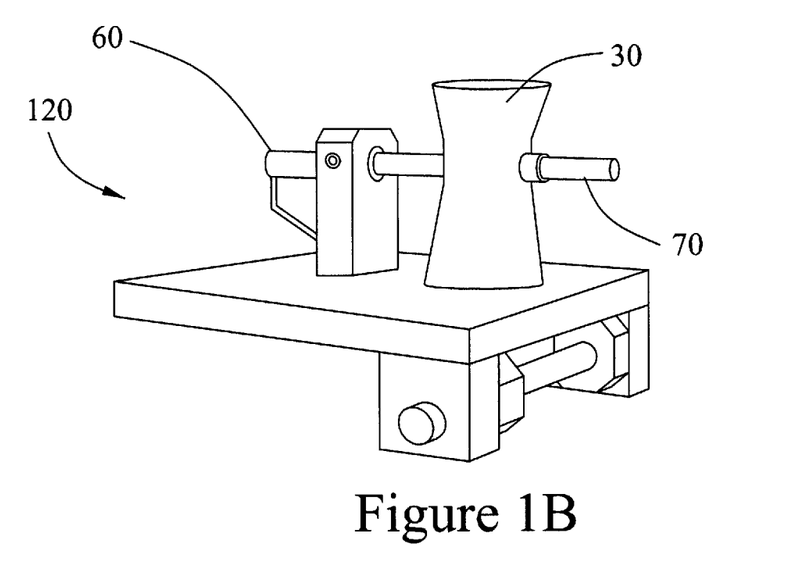
FIG. 1B shows the sand trickier (30), sand trickier rod (70) and sand trickier motor (60) of the STA.
Figure 1C:
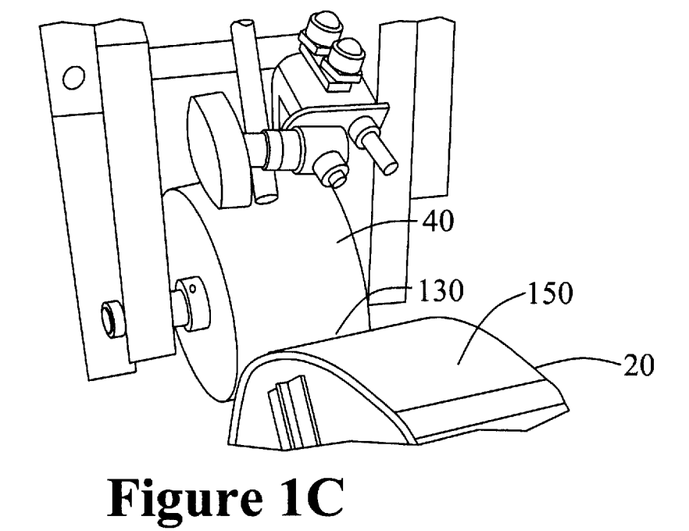
FIG. 1C shows the interaction of the nib wheel (40) and the main wheel (20) of the STA.
Figure 1D:
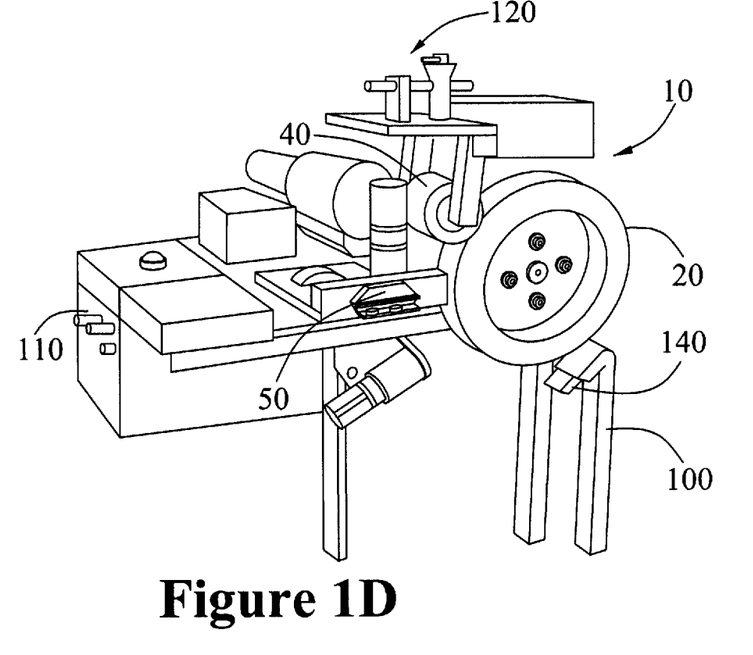
FIG. 1D shows the different components of the STA mounted on a frame (100).

As shown in FIG. 1D, the Stick Testing Apparatus (10) comprises a frame (100) for mounting the following components: a standard stick mounting bracket (50), which receives a solid stick composition sample; an abrasion resistant steel main wheel (20) and a cooperating nib wheel (40); a sand applicator assembly (120); and a control box (110). As shown in FIG. 1B, the sand applicator assembly (120) comprises a sand trickier (30) into which sand is loaded, a sand trickier rod (70) for introducing sand onto the surface of the main wheel (40) and a sand trickier motor (60).

In use, the sand trickier (30) is loaded with sand, which may have been sieved to eliminate particles greater than a known size, for example, but not limited to 300 microns. A solid stick composition sample to be tested is installed in the standard stick mounting bracket (50). The main wheel (20) may be set to rotate at a known speed, for example, but not limited to, about 32 kph. Sand is introduced onto the surface of the main wheel (20) via the sand trickier rod (70) powered by the sand trickier motor (60). The nib wheel (40) is applied to the main wheel (20) at a known pressure, for example, but not limited to about 138 Kpa. As the main wheel (20) rotates, it drives the nib wheel (40) and sand trickles into the interface (130) between the nib wheel (40) and the main wheel (40) creating an abrasive environment. The solid stick composition sample is then applied, under a known pressure, to an application surface (150) of the main wheel and exposed to the abrasive environment. A blade (140) may be used to clean the application surface (150) from sample build up, by applying the blade (140) to the application surface (150) under pressure, for example, but not limited to, 15 psi. Alternatively, or additionally, brushes (not shown) may be used to clean the application surface (150). The control box (110) controls operation of the various components of the STA.

The consumption rate of the sample can be measured using the following wear rate calculations, based on the displacement of the stick observed during the testing. First the area (A) of the worn surface may be calculated by multiplying the height (H) of the stick by its width (W), namely H×W=A. However, as the stick wears it conforms to the roll surface, therefore the wearing surface is slightly curved. So in order to get a more accurate representation, an arc length formula can be used to find the length (L) of the curved side as follows:

$$L = -H/2 \int^{H/2} \sqrt{[1+(y^2)/(\text{roll } radius^2 - y^2)]} dy$$
$$A = L \times W$$

Wear surface area multiplied by observed stick displacement (D) will give volume (V) of the stick worn. Volume multiplied by density (ρ) will yield the weight (m) of the product consumed.

$$A \times D = V$$
$$V \times \rho = m$$

Time interval (t) over which stick displacement was measured multiplied by roll speed (rpm) and roll circumference (Π×roll diameter) will give the total distance (d) over which the stick was being applied. Total distance divided by consumed weight of the stick will yield the sample stick's wear rate.

$$t \times rpm \times (\prod \times \text{roll diameter}) = d$$
$$d/m = \text{wear rate}$$

EXAMPLE 4

Sample Wear—Stick Consumption Rate

The consumption rate of solid stick composition samples was measured using the STA testing method herein described in Example 3. Solid stick composition samples were prepared in accordance with Table 1 (51% and 60% (w/w) $MoS_2$) using different resin components given in Example 1. The STA regime used was as follows:

Sand delivery was set at a constant delivery rate of 925, which is approximately 80 grams per hour Nib wheel (40) was applied to the main wheel (40) at a pressure of 32 psi Sample composition stick was applied using the standard stick mounting bracket (50) with a spring force of 3.5 lb (15.6N).

Main wheel (20) was set to rotate at a speed of 482 rpm or 20 mph (32 kph).

Samples were tested for 60 minutes with a reading of the change in displacement of sample taken every 20 minutes. A cleaning cycle was performed between each stick testing by running the main wheel (20) using the settings given above for 20 minutes, with sand and the nib wheel (40) engaged.

The average displacement over 60 minutes for each sample stick is given in FIGS. 2A and 2B, which indicate that for both 51% and 60% (w/w) $MoS_2$ samples, solid stick compositions comprising vinyl ester resins (Group II resins) have a lower stick consumption rate than corresponding samples comprising isophthalic polyester and halogenated isophthalic polyester resins (Group I resins).

EXAMPLE 5

Field Trials—Consumption of Solid Stick Compositions

Field trials were carried out to assess the consumption rate of a standard low coefficient of friction (LCF) solid stick composition comprising an isophthalic polyester resin, compared to a solid stick composition comprising an epoxy vinyl ester resin. Three trams (Tram A, B and C) were outfitted with the LCF sticks or epoxy vinyl ester resin sticks and stick consumption was measured as a function of distance traveled.

The results given in FIG. 3A, FIG. 3B and FIG. 3C show that, in each case, the epoxy vinyl ester resin sticks showed less consumption as a function of distance traveled compared to the LCF sticks comprising an isophthalic polyester.

All citations are hereby incorporated by reference.

The present invention has been described with regard to one or more embodiments. However, it will be apparent to persons skilled in the art that a number of variations and modifications can be made without departing from the scope of the invention as defined in the claims.

What is claimed is:

1. A solid stick composition comprising:
   a) from about 35 to about 65 weight percent epoxy vinyl ester resin;
   b) from about 35 to about 65 weight percent solid lubricant, wherein the solid lubricant is selected from the group consisting of molybdenum disulphide, tungsten disulphide, graphite, boron nitride, boric acid, aluminum stearate, zinc stearate, coal dust, and a mixture thereof; and
   c) from 0 to about 40 weight percent friction modifier.

2. The solid stick composition of claim 1, wherein the composition comprises from about 40 to about 60 weight percent epoxy vinyl ester resin.

3. The solid stick composition of claim 2, wherein the composition comprises from about 40 to about 55 weight percent epoxy vinyl ester resin.

4. The solid stick composition of claim 1, wherein the composition comprises from about 40 to about 65 weight percent solid lubricant.

5. The solid stick composition of claim 4, wherein the composition comprises from about 45 to about 65 weight percent solid lubricant.

6. The solid stick composition of claim 1, wherein the composition comprises from about 1 to about 30 weight percent friction modifier.

7. The solid stick composition of claim 1, wherein the composition comprises
   a) from about 40 to about 60 weight percent epoxy vinyl ester resin; and
   b) from about 40 to about 60 weight percent solid lubricant.

8. The solid stick composition of claim 1, wherein the solid lubricant is selected from the group consisting of graphite, molybdenum disulphide and a mixture thereof.

9. The solid stick composition of claim 8, wherein the solid lubricant is molybdenum disulphide.

10. The solid stick composition of claim 1, wherein the composition does not comprise a thermosetting plasticizer.

11. A method of controlling friction between a metal surface and a second metal surface by applying the solid stick composition of claim 1 to one or more than one of the metal surfaces.

12. A method of reducing lateral force in a rail system comprising applying the solid stick composition of claim 1 onto a wheel or rail surface.

13. A solid stick composition comprising:
   a) from about 35 to about 65 weight percent vinyl ester resin, wherein the vinyl ester resin is selected from the group consisting of a vinyl polyester resin, a vinyl ester resin, a bisphenol vinyl ester resin, an epoxy vinyl ester resin, a bispenol epoxy vinyl ester resin, an epoxy novolac-based vinyl ester resin, and brominated bispenol epoxy vinyl ester resin;
  b) from about 35 to about 65 weight percent solid lubricant, wherein the solid lubricant is selected from the group consisting of molybdenum disulphide, tungsten disulphide, graphite, boron nitride, boric acid, aluminum stearate, zinc stearate, coal dust, and a mixture thereof; and
  c) from 0 to about 40 weight percent friction modifier,
wherein the solid stick composition is characterized as having an average hardness of between 82-88 as determined using a D-Type Durometer and ASTM D 2240 Standard Test Method for Rubber Property-Durometer Hardness.

14. The solid stick composition of claim 13, wherein the composition comprises
  a) from about 40 to about 60 weight percent vinyl ester resin; and
  b) from about 40 to about 60 weight percent solid lubricant.

15. The solid stick composition of claim 13, wherein the composition comprises from about 45 to about 65 weight percent solid lubricant.

16. The solid stick composition of claim 1, wherein the epoxy vinyl ester resin is selected from the group consisting of a bispenol epoxy vinyl ester resin, an epoxy novolac-based vinyl ester resin, and brominated bispenol epoxy vinyl ester resin.

17. A method of controlling friction between a metal surface and a second metal surface by applying a solid stick composition to one or more than one of the metal surfaces, the solid stick composition comprising:
  a) from 20 to 80 weight percent epoxy vinyl ester resin;
  b) from 1 to 80 weight percent solid lubricant, wherein the lubricant is selected from the group consisting of molybdenum disulphide, tungsten disulphide, graphite, boron nitride, boric acid, aluminum stearate, zinc stearate, coal dust, and a mixture thereof; and
  c) from 0 to 40 weight percent friction modifier.

18. A method of reducing lateral force in a rail system comprising applying a solid stick composition onto a wheel or rail surface, the solid stick composition comprising:
  a) from 20 to 80 weight percent epoxy vinyl ester resin;
  b) from 1 to 80 weight percent solid lubricant, wherein the lubricant is selected from the group consisting of molybdenum disulphide, tungsten disulphide, graphite, boron nitride, boric acid, aluminum stearate, zinc stearate, coal dust, and a mixture thereof; and
  c) from 0 to 40 weight percent friction modifier.

* * * * *